US008871841B2

(12) United States Patent
Muir et al.

(10) Patent No.: US 8,871,841 B2
(45) Date of Patent: Oct. 28, 2014

(54) PROCESS FOR MAKING HIGH-PRESSURE SHEET GASKETING MATERIALS

(75) Inventors: Matthew C. Muir, Fairport, NY (US); Kenneth Hill, Newark, NY (US); Michael P. McNally, Newark, NY (US)

(73) Assignee: Garlock Sealing Technologies, LLC, Palmyra, NY (US)

( * ) Notice: Subject to any disclaimer, the term of this patent is extended or adjusted under 35 U.S.C. 154(b) by 1413 days.

(21) Appl. No.: 12/446,123

(22) PCT Filed: Dec. 7, 2007

(86) PCT No.: PCT/IB2007/003814
§ 371 (c)(1),
(2), (4) Date: Nov. 3, 2010

(87) PCT Pub. No.: WO2008/068606
PCT Pub. Date: Jun. 12, 2008

(65) Prior Publication Data
US 2012/0095137 A1    Apr. 19, 2012

Related U.S. Application Data

(60) Provisional application No. 60/873,336, filed on Dec. 7, 2006.

(51) Int. Cl.
*C08L 9/02*    (2006.01)
*C08K 13/02*    (2006.01)

(52) U.S. Cl.
USPC ............................................ 524/34; 524/315

(58) Field of Classification Search
USPC ................................... 524/35, 315
See application file for complete search history.

(56) References Cited

U.S. PATENT DOCUMENTS

| 5,240,766 | A |  | 8/1993 | Foster |
|---|---|---|---|---|
| 5,824,755 | A |  | 10/1998 | Hayashi et al. |
| 6,660,327 | B2 | * | 12/2003 | Cordova ................... 427/207.1 |
| 2006/0166580 | A1 | * | 7/2006 | Itoi et al. ...................... 442/168 |

FOREIGN PATENT DOCUMENTS

| GB | 2 236 756 | 4/1991 |
|---|---|---|
| GB | 2 250 710 | 6/1992 |
| WO | WO 02/40593 | 5/2002 |
| WO | WO 02/40593 A2 * | 5/2002 ............ C08L 101/00 |

OTHER PUBLICATIONS

International Searching Authority "Notification of Transmittal of the International Search Report and the Written Opinion of the International Searching Authority, or the Declaration", May 7, 2008.
Search Report of co-pending Taiwan patent application No. 96146520, dated May 9, 2013, 1 page.

* cited by examiner

*Primary Examiner* — Robert D. Harlan
(74) *Attorney, Agent, or Firm* — Perkins Coie LLP

(57) ABSTRACT

A method for making high-pressure sheet gasketing material is provided that employs an elastomer, such as natural rubber and/or acylonitrile-butadiene rubber. Tert-butyl acetate is added to dissolve the elastomer. Other components may then be mixed with the dissolved elastomer and may include, for example, antioxidants, colorants, curing agents, curing accelerators, reinforcing fillers, and fibers such as organic and/or mineral fibers. The resulting dough may be formed into a high-pressure sheets, for use as gasketing material, using a two-roll sheeter machine, or the like.

25 Claims, No Drawings

PROCESS FOR MAKING HIGH-PRESSURE SHEET GASKETING MATERIALS

The invention claims priority from U.S. Provisional Patent Application No. 60/873,336 entitled AN IMPROVED PROCESS FOR MAKING HIGH-PRESSURE SHEET GASKETING MATERIALS, filed on Dec. 7, 2006, which Provisional Patent Application is hereby incorporated by reference in its entirety.

BACKGROUND

High-pressure sheets used as gasketing material have traditionally been prepared by mixing a base of fibers with a rubber binder and subjecting the resultant mixture to pressure and elevated temperature. Typically, such sheets have been made on a two-roll sheeter machine, such as a Troester machine, having a pair of rolls located one above the other. The lower roll has been typically provided as a larger, heated roll while the upper roll has been provided as a smaller, normally unheated roll. To the conventional sheet on a machine of this type, a quantity of starter compound is first built up on the hot roll. A quantity of body compound is then added in the nip between the two rotating rolls. A high pressure sheet material is formed on the hot roll to the desired thickness and can then be removed and placed on a table or other support.

The standard process for manufacturing high pressure sheets has involved mixing two separate component doughs, both of which have been essential components in making the high pressure sheet product. The main component, referred to as the body dough, has been mixed, for example, in a large drum mixer, although it has been known to be mixed in any of a variety of different mixer types. The components of this dough have typically included, for example, elastomers such as rubber materials, fibers, fillers such as clay, and small quantities of other materials, such as curing components, antioxidants and/or coloring agents which are known to those skilled in rubber compounding technology.

The beginning of the mixing process has typically involved introducing a pre-determined quantity of solvent into the mixer. Next, a pre-determined amount of elastomer, such as a rubber material, has likewise been introduced into the, mixer. The function of the solvent has been to dissolve the elastomer, thus allowing for uniform mixing with the other components in the body dough, and to aid in maintaining a proper viscosity of the body dough mixture, so that it builds properly on the hot roll during the sheeting process. Many solvents have been used in this process, including methyl ethyl ketone, heptane, and toluene, all of which are particularly hazardous.

Once the rubber material has been dissolved in the solvent, other components may be mixed in. The materials have been introduced into the mixer in different sequences, and depending on factors such as the materials used and the size of the mixture, a set time can be established for various steps of the operation. Once the mixture has achieved its desirable properties in terms, for example, of the state of the mixing, the quantity of solvent that is in the mix, etc., it is released from the mixer and transferred to the sheeting part of the operation.

Another important component of the high pressure sheet is a minority component which is referred to as the start coat. The start coat is a material which is formulated of materials very similar to the body dough formulation. A key characteristic of the start coat formulation is that it must adhere well to the hot roll of the sheet calendar in the manner described hereinafter. However, another key characteristic of the start coat formulation is that once the sheet has been built up to its desired thickness, the start coat must release easily from the calendar to provide a sheet that is very clean and smooth.

The calendaring operation begins once the start coat and body dough are transferred to the roll calendar. The two-roll calendar is a machine that is well known in rubber processing operations and consists of two rolls which are parallel to one another. Typically, one of the two rolls is heated to any of a variety of temperatures by internal heating components and a typical run temperature for the heated roll is from about 200° F. up to about 280° F. The other roll, known as the cold roll, can be cooled, for example, by water circulating within the roll. The material which is used to make the high pressure sheet material, i.e., the dough, is introduced into the nip between the two rotating calendar rolls.

A significant difference between the sheeting mill calendar and a typical rubber calendar has been that in a typical-rubber calendar, the rolls are held at a fixed gap between the two rolls and the material is squeezed in the gap between the two rolls, thus forming a rubber sheet of a pre-determined thickness. However, in the sheeting mill calendar, the gap between the two rolls is not fixed, but instead, the pressure on the two rolls is set such that the pressure applied at the nip is pre-determined. The sheet material, i.e., the dough, adheres to the hot roll thereby creating a back pressure against the two rolls. The pre-determined pressure at the nip between the two rolls is thus maintained as the dough adheres first to the hot roll and thereafter as additional dough adheres to the dough already deposited on the hot roll. Thus, while the pressure between the two rolls remains constant, the gap between the two rolls is allowed to increase as the material builds up to a desired thickness of the material.

At the commencement of the calendaring operation, an initial, relatively small quantity of the start coat formulation is introduced into the nip between the calendar rolls, which results in the adherence of a thin layer of the start coat, which can be as thin as 0.002 inch thick, to the heated roll. Thereafter; the body dough material is introduced into the nip between the calendar rolls and allowed to build up on top of the thin layer of start coat. The sheet that builds up on the hot roll can be thought of, for example, as a series of thin laminates adhering to one another. As the body dough material builds up on the heated roll, it forces the calendar rolls apart, and when the sheet which is building up reaches a desired thickness, the operation is stopped and the sheet is removed from the roll. The typical calendaring operation is a batch process in which one sheet at a time is formed with a width and length that is determined by the dimensions of the roll. In other words, the length and width of the sheet are determined by the length and circumference of the roll. However, the thickness of the sheet is allowed to build up under a pre-determined nip pressure until a desired sheet thickness is reached.

Typically, before the start coat is introduced, the calendar rolls literally touch one another, and as dough is introduced into the nip between the calendar rolls, the thickness of the sheet increases in very small increments on the order of 0.001 inch or less as the material builds up by adhering first to the heated roll and then to itself as thickness continues to build. It is noted that the sheeting operation is typically performed by a highly skilled operator who stops the operation when the desired sheet thickness is reached and uses, for example, a cutting device to cut the sheet along the length and circumference of the roll and removes the sheet from the roll and transfers it to a flat supporting surface.

A significant disadvantage of previously employed processes is found in the use of organic solvents, such as toluene, heptane, and methyl ethyl ketone, which have very low flash points and can be explosively flammable and which are also highly toxic. In addition, the explosive flammability of the material is greatly affected by any possible buildup of static charge in the dough and in the surroundings. It is readily apparent that as a static charge is built up, a spark can be created which can ignite an explosive fire. Thus, there is a present need for a process for making high-pressure sheet gasketing material that employs a less hazardous solvent than those previously used.

Another disadvantage of the currently employed process is the quality of the sheets which are produced by the process. A critical aspect of the process of building up the thickness of a sheet is ensuring that all of the material that goes into making the sheet builds up only on the heated roll and does not adhere to the cold roll. Any material which adheres to the cold roll will have the affect of producing a rough sheet. Thus, even a small amount of buildup on the cold roll will result, in a sheet that has a rough surface which is not only visually unattractive but also has a deleterious affect on the performance of the material, for example, in terms of sealability as a gasket material. Accordingly, there is also a present need for a process for making high-pressure sheet gasketing material with improved processability and sealing performance.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

It is a feature and advantage of the present technology to provide a method for making high-pressure sheet gasketing material employing a less hazardous solvent, such as tert-butyl acetate, than those previously used.

It is an additional object and feature of the subject technology to provide a method for making high-pressure sheet gasketing material which has improved processability and sealing performance.

To achieve the stated and other features, advantages and objects; embodiments of the present technology provide a method for making high-pressure sheet gasketing material employing, for example, tert-butyl acetate, chemically represented by $(CH_3)_3$—C—O—$COCH_3$, as a solvent in the sheeting process. Tert-butyl acetate is not listed by the United States Environmental protection Agency as a Volatile Organic Chemical (VOC) and is thus safer and more environmentally friendly than the solvents which have been employed in previous sheeting processes in the past, such as toluene, methyl ethyl ketone, and heptane. In particular, tert-butyl acetate shows a higher Permissible Exposure Limit (PEL) than toluene, one of the most commonly used solvents. Further, the mixtures made by the process for embodiments of the technology produce a composite which processes extraordinarily well in the sheeting step in that, for example, during the sheet-building process, the cold roll remains clean with a minimum of effort on the part of the operator. Additionally, the sealability of sheet made by the process with embodiments of the embodiment is superior to that made by the traditional process.

Additional objects, advantages and novel features of the technology will be set forth in part in the description which follows, and in part will become more apparent to those skilled in the art upon examination of the following, or may be learned from practice of the technology.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Embodiments of the present technology use, for example, tert-butyl acetate or other suitable organic solvent having similar chemical, physical and toxicological properties, as a solvent in the process of mixing the body dough for the sheeting process. Those of skill in the art will appreciate that organic solvents having similar chemical, physical and toxicological properties as tert-butyl acetate will include other members of the acetate family, such as n-propyl acetate, n-butyl acetate, sec-butyl acetate, isopropyl acetate, pentyl acetate, and isopentyl acetate. Thus, in an embodiment of the technology, a pre-determined quantity of tert-butyl acetate is introduced into a mixer. Thereafter a pre-determined amount of elastomer, such as natural rubber and/or acylonitrile-butadiene rubber is likewise introduced into the mixer. Once the elastomer is dissolved in the tert-butyl acetate, the other components are mixed in. Such other components include, for example, antioxidants, colorants such as zinc oxide, curing agents such as sulfur, curing accelerators such as TMTD (tetramethylthiuram disulfide) powder, reinforcing fillers such as clays and inorganic materials, and fibers such as organic and/or mineral fibers.

Table I illustrates an example of proportions of the components used for mixing the body dough for the process of making high-pressure sheet gasketing material for embodiments of the technology.

TABLE I

| Component | Weight Percent |
| --- | --- |
| Polymers: | |
| Natural Rubber | 0-3% |
| Acrylonitrile-Butadiene Rubber | 10-18% |
| t-Butyl Acetate (Solvent) | 20-50% |
| Powders: | |
| Antioxidant | 0.1-0.3% |
| Zinc Oxide | 0.4-1.0% |
| Sulfur (Curing Agent) | 0.1-0.4% |
| TMTD Powder (Curing Accelerator) | 0.1-0.4% |
| Fillers: | |
| Reinforcing Fillers (Clays and Inorganic Materials) | 40-80% |
| Fibers: | |
| Organic and/or Mineral Fibers | 10-40% |

A significant advantage in using tert-butyl acetate as a solvent in the process for embodiments of the technology is that the flash point of tert-butyl acetate (62° F.-72° F.) is substantially higher than the flash point of toluene (39.2° F.) and thus tert-butyl acetate is significantly less explosively flammable than toluene. Similarly, n-propyl acetate, n-butyl acetate, sec-butyl acetate. isopropyl acetate, pentyl acetate, and isopentyl acetate have flashpoints between the range of approximately 58° F. to 100° F. Further, by virtue of its sub-polar bonds in the molecule itself, tert-butyl acetate has a greater inherent charge than the inherent charge of toluene. Since it is a more polar molecule than toluene, the buildup of static charge is less likely, thus reducing the possibility of creating a spark which can ignite an explosive fire during the mixing and/or sheeting process. In addition, unlike toluene which is listed by the United States Environmental Protection Agency as a Volatile Organic Compound (VOC), tent-butyl, n-propyl acetate, n-butyl acetate, sec-butyl acetate, isopropyl acetate, pentyl acetate, and isopentyl acetate are not listed by the United States Environmental protection Agency as VOCs, so they are more environmentally friendly. Additionally, various toxicity measurements show that tert-butyl acetate, n-propyl acetate, n-butyl acetate, sec-butyl acetate, isopropyl acetate, pentyl acetate, and isopentyl acetate are less toxic than toluene.

Table II illustrates a more detailed example of proportions of specific components used for mixing the body dough for embodiments of the technology.

TABLE II

| Component | Weight (lbs dry) | Weight Percent |
|---|---|---|
| Polymers: | | |
| Natural Rubber: | 0.6 | 1.0% |
| Acrylonitrile-Butadiene Rubber | 6.9 | 11.5% |
| t-Butyl Acetate (Solvent) | 6-7 Gallons | 20%-50% by weight of body dough |
| Powders: | | |
| Santowhite Powder (Antioxidant) | 0.1 | 0.2% |
| Zinc Oxide | 0.4 | 0.6% |
| Sulfur #104 (Curing Agent) | 0.1 | 0.2% |
| TMTD Powder (Curing Accelerator) | 0.1 | 0.2% |
| Fillers: | | |
| Barium Sulfate (Reinforcing Filler) | 6.0 | 10.0% |
| Iron Oxide | 3.0 | 5.0% |
| Nyad G (Mineral Wool Filler) | 6.0 | 10.0% |
| Clay (Reinforcing Filler) | 12.1 | 20.1% |
| Graphite Powder | 6.0 | 10.0% |
| Mica | 6.0 | 10.0% |
| Fibers: | | |
| Graphite Fiber | 7.2 | 12.1% |
| Mineral Fiber | 2.6 | 4.4% |
| Kevlar Pulp | 2.6 | 4.4% |

While examples have been given of various proportions of specific components used with tert-butyl acetate as the solvent for mixing the body dough, it is to be understood that other suitable organic solvents having chemical, physical and toxicological properties similar to tert-butyl acetate can likewise be used. It is to be further understood that the process for embodiments of the technology can be used in making a variety of high pressure sheet products employing any suitable components including organic fibers such as polyaramide, nylon, polyacrylate, and/or cellulose; inorganic fibers such as sepiolite, asbestos, and/or fiberglass; carbon fibers such as graphite and/or carbon; fillers such as clays and minerals (e.g., wollastonite); and elastomers such as natural rubber, styrene-butadiene rubber, nitrile rubber, chloroprene rubber, fluoroelastomer, and acrylonitrile-butadiene rubber.

An unanticipated but highly significant advantage of embodiments of the technology is that the body dough mixed using tert-butyl acetate as the solvent tends to produce a cleaner build on the sheeter. In other words, it has been found that when tert-butyl acetate is used as the solvent in the body dough, the cold roll remains cleaner than when a corresponding toluene-based formulation is used. This has been found to be true by numerous experienced operators using the sheeter with a variety of formulations, including, for example, Kevlar or graphite as the fiber. It has also been found to be true whether the formulation uses an acrylonitrile-butadiene rubber, a styrene-butadiene rubber, or a chloroprene-butadiene rubber formulation with tert-butyl acetate as the solvent. In all such instances, the sheeter operators reported much less difficulty in keeping the cold roll clean, resulting in a higher quality sheet and/or a more robust process with less need for attention on the part of the operator.

Another unanticipated but highly significant advantage of utilizing tert-butyl acetate as the solvent in the process of mixing the body dough for embodiments of the technology is a significant improvement in the sealability of gaskets made from sheets produced in the process. For example, sealability testing according to the ASTM F37 standard was performed on gaskets that were made using tert-butyl acetate as a solvent in the process of mixing the body dough for the sheeting process for embodiments of the technology. In the ASTM F37 sealability test, a standard size and shape of gasket material is placed in a standard flange torqued down to a known bolt load which imposes a known pressure on the gasket against a smooth base of the flange. The system is then charged with nitrogen, also at a known pressure, and using a manometer, the leakage rate of nitrogen through the gasket is measured. The tert-butyl acetate version of standard sheets made according to embodiments of the technology exhibited a leakage rate in nitrogen on the order of one-half or less than that of similar sheets made with toluene as the solvent.

Table III illustrates an example of ASTM F37 sealability test results of a tert-butyl acetate version of standard gasket sheets made according to embodiments of the technology compared to that of similar sheets made with toluene as the solvent:

TABLE III

| | ASTM F37 Nitrogen Sealability (leakage rate, ml/hr) Gasket Load: 3000 psi, Internal Pressure: 30 psig | | | |
|---|---|---|---|---|
| | Carbon Fiber Gaskets, 1/16" Toluene | Carbon Fiber Gaskets, 1/16" tBAc | Graphite Fiber Gaskets, 1/16" Toluene | Graphite Fiber Gaskets, 1/16" tBAc |
| Number of Samples | 32 | 18 | 46 | 14 |
| Average | 1.42 | 0.33 | 0.75 | 0.17 |

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A process for making a dough that may be used to form compressed sheet gasketing material, the process consisting essentially of:

mixing a quantity of tert-butyl acetate with a quantity of elastomer so that said elastomer is substantially dissolved in said tert-butyl acetate; and mixing with said dissolved elastomer a quantity of filler and a quantity of fiber.

2. The process of claim 1 wherein said elastomer is comprised of a natural rubber.

3. The process of claim 1 wherein said elastomer is comprised of acrylonitrile-butadiene rubber.

4. The process of claim 1 wherein said elastomer is comprised of a mixture of natural rubber and acrylonitrile-butadiene rubber.

5. The process of claim 1 wherein said elastomer is selected from the group consisting of natural rubber, styrene-butadiene rubber, chloroprene rubber, fluoroelastomer, nitrile rubber, and acrylonitrile-butadiene rubber.

6. The process of claim 1 wherein said filler is comprised of an inorganic material.

7. The process of claim 6 wherein said filler is selected from the group consisting of clays and minerals.

8. The process of claim 1 wherein said fiber is an organic fiber.

9. The process of claim 8 wherein said fiber is selected from the group consisting of polyaramide, nylon, polyacrylate, and cellulose.

10. The process of claim 1 wherein said fiber is an inorganic fiber.

11. The process of claim 10 wherein said fiber is selected from the group consisting of sepiolite, asbestos, fiberglass, and carbon fibers.

12. The process of claim 1 further comprising:
mixing with said dissolved elastomer a quantity of at least one additional material selected from the group consisting of an antioxidant, a colorant, a curing agent, and a curing accelerator.

13. The process of claim 12 wherein said colorant includes zinc oxide.

14. The process of claim 12 wherein said curing agent includes sulfur.

15. The process of claim 12 wherein said curing accelerator includes tetramethyithiuram disulfide.

16. The process of claim 1 wherein said quantity of tert-butyl acetate approximates 20%-50% by weight of the dough.

17. The process of claim 1 where said quantity of elastomer approximates 10%-21% by weight.

18. The process of claim 1 wherein said quantity of filler approximates 40%-80% by weight.

19. The process of claim 1 wherein said quantity of fiber approximates 10%-40% by weight.

20. A process for making a dough that may be used to form sheet gasketing material, the process consisting essentially of:
mixing a quantity of solvent from the family of solvents that includes tert-butyl acetate, n-propyl acetate, n-butyl acetate, sec-butyl acetate, isopropyl acetate, pentyl acetate, and isopentyl acetate with a quantity of elastomer so that said elastomer is substantially dissolved in said solvent; and mixing with said dissolved elastomer a quantity of filler and a quantity of fiber.

21. A composition that may be used to form compressed sheet gasketing material, the composition at least comprising:
a quantity of tert-butyl acetate;
a quantity of elastomer;
a quantity of filler; and
a quantity of fiber.

22. The composition of claim 21 wherein said quantity of tert-butyl acetate approximates 20%-50% by weight of the dough.

23. The composition of claim 21 wherein said quantity of elastomer approximates 10%-21% by weight.

24. The composition of claim 21 wherein said quantity of filler approximates 40%-80% of weight and said quantity of fiber approximates 10%-40% by weight.

25. A process for making a dough that may be used to form sheet gasketing material, the process consisting essentially of:
mixing a quantity of a solvent, having a flashpoint within the range of approximately 58° F. to 100° F., with a quantity of elastomer so that said elastomer is substantially dissolved in said solvent; and mixing with said dissolved elastomer a quantity of filler and a quantity of fiber.

* * * * *